United States Patent Office 2,711,404
Patented June 21, 1955

2,711,404
BROWN CHROME CONTAINING DYESTUFFS

Guido Schetty, Basel, Switzerland, assignor to J. R. Geigy A. G., Basel, Switzerland, a Swiss firm No Drawing. Application December 26, 1951, Serial No. 263,507

Claims priority, application Switzerland January 11, 1951

7 Claims. (Cl. 260—145)

It is known that mixtures of two metallisable dyestuffs of different constitution can be chromed in such a way that complex chromium compounds result which, in the same complex molecule contain both dyestuffs bound to one and the same chrome atom. In this way, mixed chromium complexes of metallisable azo dyestuffs which contain a sulphonic acid group have been described in the literature. These dyestuffs draw on to wool from a strongly acid bath. However, mixed chrome complexes of metallisable dyestuffs which do not contain a sulphonic acid group and which can be used as lacquer dyestuffs are also known. All the processes for the production of mixed chrome complex compounds of metallisable dyestuffs are concerned with combinations of those dyestuffs which as complex chrome compounds have the same or very similar shades, for instance combinations of navy blues and navy blues and blacks, of blacks with blacks, or orange shades with reds.

It is surprising now to find that on chroming a mixture of equimolecular amounts of azo dyestuffs of the general Formula I (orange in the form of their chrome complexes) with azo dyestuffs of the general Formula II (grey in the form of their chrome complexes):

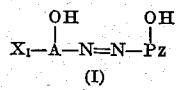
(I)

and

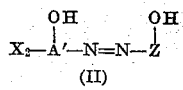
(II)

water soluble mixed chrome complex compounds are obtained which dye wool in brown shades.

In the above formulae:

A and A' represent aromatic nuclei of the benzene series containing the hydroxy group in ortho position to the azo group and the substituents $X_1$ and $X_2$ in para position to the hydroxy group and wherein the one X is a member selected from the class consisting of low molecular alkylsulphonyl and

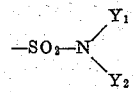

groups and the other X is a member selected from the class of the nitro group, low molecular alkylsulphonyl and

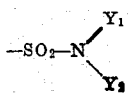

groups, Y meaning a member selected from hydrogen, low molecular alkyl and hydroxyalkyl groups, Pz represents the radical of a 1-aryl-3-methyl-5-pyrazolone of the benzene series coupled in the 4-position and Z means the radical of a 1-acylamino-7-hydroxynaphthalene coupled in the 8-position and the aromatic rings may contain other substituents such as hydrogen, chlorine, a methyl or an acylamino group usual in azo dyestuffs if desired, but the azo dyestuffs I and II may not contain any acid groups which would render them water soluble.

As follows from paper chromatograms and fractionated dyeings on wool, the chrome containing dyestuffs according to the invention are mostly uniform, and in every case the preponderant part is a mixed chrome complex compound of the general formula I—Cr—II wherein I and II represent the co-ordinated monoazo dyestuffs defined above. Formula III may be taken as probable constitution formula:

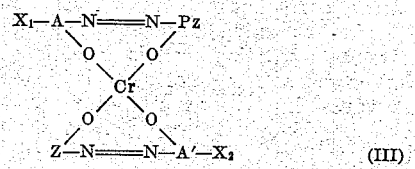
(III)

wherein A, A', X, Pz and Z have the meanings given above.

The following may be listed as diazo components for the dyestuffs of the general Formulae I and II usable according to this invention: 2-aminophenol-4-methyl-, ethyl-, -n-propyl-, -n-butyl-, n-amylsulphone, 2-aminophenol-4-sulphonic acid amide, -methylamide, -ethylamide, -dimethylamide, -diethylamide, -oxethylamide, -dioxethylamide, 6-chloro-2-aminophenol-4-alkyl sulphones, 6-acetylamino-2-aminophenol-4-alkyl sulphones and 6-methyl-2-aminophenol-4-alkyl sulphones, 6-methyl-, 6-acetylamino- and 6-chloro-2-aminophenol-4-sulphonic acid amides etc., 4-nitro-2-aminophenol-6-chloro- and 6-methyl-4-nitro-2-aminophenol, whereby the dyestuffs made up from 2-aminophenol-4-alkyl sulphones have better drawing power from a neutral bath. The drawing power on to wool is increased by the entry of a chlorine atom into the 6-position of the 2-aminophenol-4-alkyl sulphones or the 2-aminophenol-4-sulphonic acid amides.

The following compounds for example come into question as coupling components for the formation of the dyestuffs of the general Formula I: 1-phenyl-3-methyl-5-pyrazolone, 1-(3'-chlorophenyl)-3-methyl-5-pyrazolone, 1-(4'-bromophenyl)-3-methyl-5-pyrazolone, 1-(4'-methylphenyl)-3-methyl-5-pyrazolone, 1-(4'-nitrophenyl)-3-methyl-5-pyrazolone, 1-(2',5'-dichlorophenyl)-3-methyl-5-pyrazolone, 1-(3',4'-dichlorophenyl)-3-methyl-5-pyrazolone, 1-(4'-methoxyphenyl)-3-methyl-5-pyrazolone etc. Those pyrazolones which are substituted by halogen atoms lead to mixed complexes which have an increased drawing power from a neutral bath.

The following compounds for example come into question as coupling components for the formation of the dyestuffs of the general Formula II: acetyl-, propionyl-, methoxyacetyl-, carbomethoxy-, methoxy-carbethoxy-aminonaphthol-(1.7) etc. Here the increase in drawing power from a neutral bath is roughly parallel to the increase in the molecular weight of the acyl radical.

Azo dyestuffs of the general Formulae I and II according to this invention the diazo components of which may be the same or different can be combined. Complex chrome compounds according to this invention which are produced from azo dyestuffs I and II which dyestuffs are derived from the same diazo components are technically of great advantage because they can be particularly easily produced by mixed coupling followed by chroming. Particularly valuable combinations which draw well from a neutral bath are obtained when 2-aminophenol-4-alkyl sulphones are used as diazo components in both dyestuff components and if on the one hand 1-carbalkoxyamino-7-hydroxynaphthalenes with a low alkyl radical, preferably a methyl group, in the acyl radical and on the other hand 1-phenyl-3-methyl-5-pyrazolones chlorine substituted in the benzene ring are chosen as coupling components.

Normal and complex salts and hydroxides of trivalent chrome such as chrome acetate, chrome formiate, sodium chromosalicylate ammonium chromosalicylate are suitable as chroming agents. Chroming agents are particularly suitable which are capable of metallising in an alkaline or neutral medium such as the alkali salts of chromosalicylic acid. Chroming can be performed in the usual way, open or under pressure, in aqueous solution or suspension or in the presence of salts or inert organic solvents or solubility promoters. The chroming agents are used in such a way that at least 1 chrome atom corresponds to two molecules of metallisable azo dyestuff.

Apart from the valuable shade of the new complex chrome compounds which has never been attained before by mixed chroming of metallisable azo dyestuffs, the new dyestuffs according to this invention differ from the known mixed complexes by their high degree of affinity to wool. Even from a neutral or weakly acid bath they give, according to the composition, strong and full wool dyeings. The dyeings are characterised by excellent fastness to light and by very good fastness to washing, milling and sea water. A particularly important advantage of the new mixed chrome complex compounds is that both the tips and the roots of the single hairs are evenly dyed.

In cases where the water solubility of the mixed chrome complex compounds according to the invention is not sufficient for the methods usual in textile dyeing, it can be improved by the admixture of alkali phosphates or carbonates or of wetting or dispersing agents.

The chrome containing azo dyestuffs according to this invention are suitable not only for the dyeing of wool, but, due to their good drawing power from a neutral to weakly acid dye bath, are also suitable for the dyeing of silk and further for the dyeing of synthetic polyamide or polyurethane fibers such as nylon, Perlon or Lanital. They will also dye leather.

The behaviour of the mixed complexes according to this invention on dyeing is different from that of mechanical mixtures of the chrome complexes of the individual components. Mechanical mixtures have the disadvantage of producing dichroic dyeings on wool which does not occur with the mixed complexes.

The following examples illustrate the invention without limiting it in any way. Where not otherwise stated, parts are given as parts by weight and the temepratures are in degrees centigrade. The relationship of parts by volume is that of kilogrammes to litres.

*Example 1*

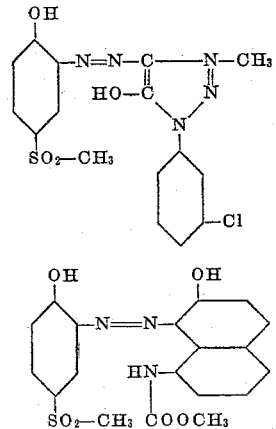

18.7 parts of 2-aminophenol-4-methyl sulphone are dissolved in 150 parts of water with 17 parts of conc. hydrochloric acid. The solution is cooled to 5° and, while adding ice at intervals, 6.9 parts of sodium nitrite 100% (as 33% solution) are added. On completion of the diazotisation, the reaction is made neutral by the addition of sodium hydrogen carbonate, 3 parts of sodium hydrogen carbonate are then added and then a solution of 22 parts of 1-(3'-chlorophenyl)-3-methyl-5-pyrazolone in 300 parts of water and 10.5 parts by volume of 10-n caustic soda lye is added. The whole is stirred without cooling until the coupling is completed, the temperature is then raised to 60° and the precipitated dyestuff (dyestuff I) is filtered off. 18.7 parts of 2-aminophenol 4-methyl-sulphone are diazotised in the manner described above and neutralised with sodium hydrogen carbonate. The diazo compound is poured at 0–3° into a solution of 22.8 parts of carbomethoxyaminonaphthol-(1.7) in 250 parts of water, 10.5 parts by volume of 10-n caustic soda lye and 15 parts of dehydrated sodium carbonate. The coupling is complete after a few hours. The whole is heated to 70°, the dyestuff which has partly entered into the solution is precipitated by the addition of sodium chloride and filtered off (dyestuff II).

42.9 parts of the monosodium salt of dyestuff I and 43.7 parts of the monosodium salt of dyestuff II are stirred together in 2000 parts of water. 220 parts of a solution of ammonium chromo-salicylate (corresponding to 5.7 parts Cr) are then added and the whole is boiled for 5 hours. A brownish-black oil separates out which on cooling solidifies in crystalline form. It is filtered off and dried. The new dyestuff is a dark powder which dissolves in hot water with a brown colour and dyes wool from a neutral bath in deep brown shades. The dyeings have a very high degree of fastness to light and very good fastness to washing, milling and sea water.

A similar dyestuff is obtained if, for the production of dyestuff I 18.7 parts of 2-aminophenol-4-methyl sulphone, 22.2 parts of 6-chloro-2-aminophenol-4-methyl sulphone or 20.2 parts of 6-methyl-2-aminophenol-4-methyl sulphone are used and instead of 22 parts of 1-(3'-chlorophenyl)-3-methyl-5-pyrazolone, 18.3 parts of 1-phenyl-3-methyl-5-pyrazolone are used.

*Example 2*

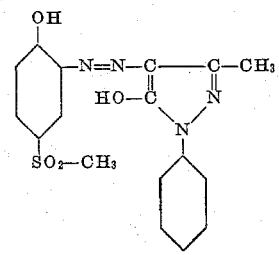

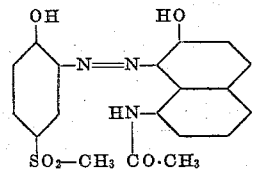

18.7 parts of 2-aminophenol-4-methyl sulphone are diazotised as described in Example 1. 8.7 parts of 1-phenyl-3-methyl-5-pyrazolone and 11 parts of acetylaminonaphthol-(1.7) are sprinkled into the still acid suspension of the diazonium compound. 35 parts by volume of 25% ammonia are then added and the whole is made up to 500 parts by volume and stirred at 0–3° until the mixed coupling is completed. This occurs after about 6 hours. 110 parts of a solution of ammonium chromo-salicylate (corresponding to 2.87 parts Cr) are then added, 400 parts of water are added and the whole is boiled for 10 hours. The dyestuff is precipitated as resin by the addition of sodium chloride. It is separated and dried. It is in the form of a dark powder which, after mixing with 10% of its weight of dehydrated sodium carbonate, has very good water solubility. The dyestuff dyes wool in dark brown shades from a weakly acetic acid bath and the dyeings have very good fastness to light, washing and milling and their evenness is good.

A very similar dyestuff is obtained if 18.8 parts of 2-aminophenol-4-sulphamide are used instead of 18.7 parts of 2-aminophenol-4-methyl sulphone.

Example 3

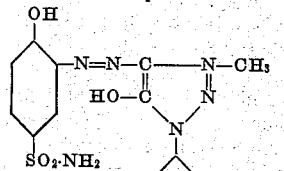

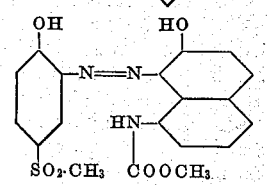

18.8 parts of 2-aminophenol-4-sulphamide are dissolved in 150 parts of water with 17 parts of conc. hydrochloric acid. The solution is cooled to 5° and diazotised by the addition of 6.9 parts of sodium nitrite (as 33% solution). The excess hydrochloric acid is neutralised by the addition of sodium hydrogen carbonate. The diazonium compound in the form of a neutral suspension is poured at 3° into a solution of 18.3 parts of 1-phenyl-3-methyl-5-pyrazolone in 200 parts of water and 20 parts of dehydrated sodium carbonate. After the coupling has been completed, the dyestuff is isolated by filtration and pasted with 37 parts of the monosodium salt of dyestuff II in Example 1 in 2000 parts of water. 210 parts of a solution of ammonium chromo-salicylate (corresponding to 5.45 parts of Cr) are added and the whole is boiled for 4 hours. A black-brown solution is formed. Sodium chloride is added whereupon the mixed complex precipitates. It is filtered off and dried. The mixed complex is a black powder which dyes wool from a weakly acetic acid bath in deep brown shades. The dyeings have very good fastness to light and good wet fastness properties.

A dyestuff with somewhat better drawing power from a neutral bath but otherwise with similar properties is obtained if instead of 18.8 parts of 2-aminophenol-4-sulphamide, 22.3 parts of 6-chloro-2-aminophenol-4-sulphamide or 20.2 parts of 6-methyl-2-aminophenol-4-sulphamide are used or if instead of 18.3 parts of 1-phenyl-3-methyl-5-pyrazolone, 23 parts of 1-(4'-nitrophenyl)-3-methyl-5-pyrazolone are used.

Example 4

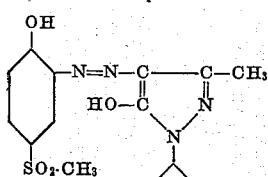

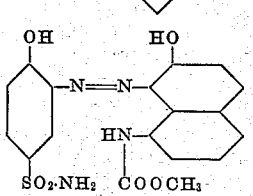

18.7 parts of 2-aminophenol-4-methyl sulphone are diazotised according to Example 1 and neutralised with sodium hydrogen carbonate. This diazonium compound is coupled with a solution of 18.3 parts of 1-phenyl-3-methyl-5-pyrazolone in 200 parts of water and 20 parts of dehydrated sodium carbonate. After heating to 60°, the dyestuff is isolated by filtration (dyestuff I).

18.8 parts of 2-aminophenol-4-sulphamide are diazotised according to Example 3, stirred with 22.8 parts of carbomethoxyaminonaphthol-(1.7) whereupon 35 parts by volume of 25% ammonia are added at 2°. The whole is stirred at 0–5° until the coupling has been completed and on the addition of sodium chloride the dyestuff is isolated by filtration (dyestuff II).

39.4 parts of the monosodium salt of dyestuff I and 43.8 parts of the monosodium salt of dyestuff II are pasted in 2000 parts of water, 240 parts of a solution of ammonium chromo-salicylate (corresponding to 6.2 parts of Cr) are added, and the whole is boiled for 4 hours. A dark brown solution is formed from which, by the addition of sodium chloride, the dyestuff is precipitated. It is filtered off and dried. The new dyestuff, a black powder, dyes wool in very level dark brown shades from an acetic acid bath. The dyeings have very good fastness to light properties.

If, instead of 22.8 parts of carbomethoxyaminonaphthol-(1.7) 24.3 parts of carboethoxyaminonaphthol-(1.7) or 27.4 parts of carbomethoxyethoxy-aminonaphthol-(1.7) are used, dyestuffs are obtained which draw somewhat better from a neutral bath but otherwise have similar properties.

Example 5

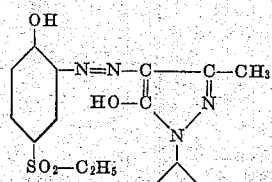

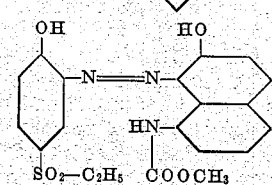

20.1 parts of 2-amino-1-hydroxybenzene-4-ethyl sulphone are dissolved in 150 parts of water and 17 parts of conc. hydrochloric acid and diazotized at 0–5° with a concentrated aqueous solution of 6.9 parts of sodium nitrite. The excess mineral acid is then neutralised with 3 parts of sodium hydrogen carbonate. The diazo compound is then poured into a solution of 8.7 parts of 1-phenyl-3-methyl-5-pyrazolone, 11.4 parts of 1-carbomethoxyamino-7-hydroxynaphthalene, 4 parts of sodium hydroxide and 8 parts of sodium carbonate in 300 parts of water and coupled at 0–5° until the diazo compound has disappeared. The mixture is heated to 70°, the dyestuff is completely precipitated with sodium chloride and filtered off.

125 parts of ammonium chromo-alicylate (corresponding to 2.85 parts of Cr) are added to the dyestuff which as a paste has been stirred into 1000 parts of water, and the whole is boiled for 5 hours under reflux. The brown-black complex chrome compound is completely precipitated with sodium chloride, drawn off by suction and dried. After thoroughly mixing with 10% of its weight of sodium carbonate, the brown-black powder completely dissolves in hot water with a brown colour. It dyes wool in very level and fast brown shades from a neutral bath containing ammonium sulphate.

If in the above example instead of 2-amino-1-hydroxybenzene-4-ethyl-sulphone, 21.5 parts of 2-amino-1-hydroxybenzene-4-n-propyl sulphone are used and otherwise the same procedure is followed, a dyestuff is obtained which is somewhat more difficultly water soluble but has an increased drawing power on to wool. The wool dyeings of this dyestuff have a somewhat better fastness to sea water.

In the above example the 1-phenyl-3-methyl-5-pyrazolone is replaced by 10.5 parts of 1-(3'-chlorophenyl-3-methyl-5-pyrazolone, similar dyestuffs are obtained.

*Example 6*

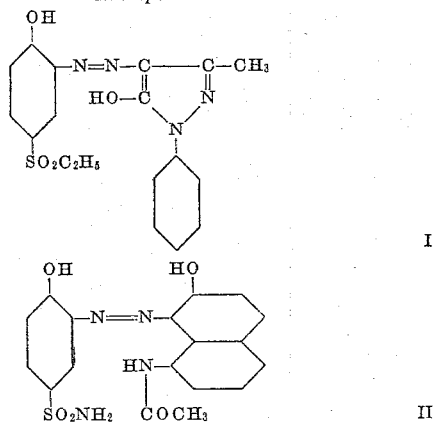

20.1 parts of 2-amino-1-hydroxybenzene-4-ethyl sulphone are diazotized as described in Example 5 and then coupled with 17.4 parts of 1-phenyl-3-methyl-5-pyrazolone and 4 parts of sodium hydroxide in 500 parts of water at 10°. The dyestuff is salted out in the usual way and drawn off under suction (dyestuff I).

18.8 parts of 2-amino-1-hydroxybenzene-4-sulphonic acid amide are diazotized in the same way as the diazo component in Example 5, and coupled at 0–5° with 20.1 parts of 1-acetylamino-7-hydroxynaphthalene dissolved in 500 parts of water and 4 parts of sodium hydroxide and 8 parts of sodium carbonate. The dyestuff is salted out and drawn off under suction (dyestuff II).

The united dyestuff pastes are then stirred with 2000 parts of water and 250 parts of a solution of ammonium chromosalicylate (corresponding to 5.7 parts of chrome) and the whole is boiled for 5 hours under reflux. The black-brown complex chrome compound which has already precipitated to a great extent is completely precipitated at 50° by means of common salt, drawn off under suction, dried and well mixed with 10% of its weight of sodium carbonate. The dyestuff now completely dissolves in hot water with a brown colour and it dyes wool in very fast brown shades from a bath containing ammonium sulphate.

If instead of 2-amino-1-hydroxybenzene-4-ethyl sulphone, 21.6 parts of the corresponding 4-n-butyl sulphone are used for the production of dyestuff I, a very similar dyestuff is obtained.

*Example 7*

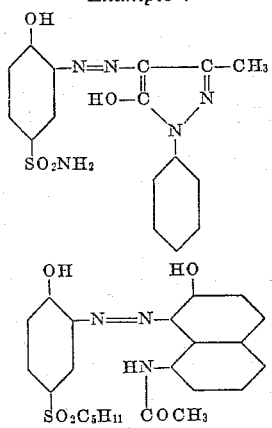

18.8 parts of 2-amino-1-hydroxybenzene-4-sulphonic acid amide are diazotized in a manner similar to the diazo component of Example 5 and coupled with 17.5 parts of 1-phenyl-3-methyl-5-pyrazolone dissolved in 500 parts of water with 4 parts of sodium hydroxide. The dyestuff is precipitated with common salt and drawn off under suction in the usual way. (Dyestuff I.)

23.0 parts of 2-amino-1-hydroxybenzene-4-n-amyl sulphone are diazotized in a manner similar to the diazo component of Example 5 and coupled at 0–5° with 20.1 parts of 1-acetylamino-7-hydroxynaphthalene dissolved in 500 parts of water with 4 parts of sodium hydroxide and 8 parts of sodium carbonate. The dyestuff is salted out with common salt and drawn off under suction. (Dyestuff II.)

The unified dyestuff pastes are stirred with 2000 parts of hot water and then 250 parts of a solution of ammonium chromosalicylate, corresponding to 5.7 parts of chrome, are added and the whole is boiled for 5 hours under reflux. The black-brown chrome compound which has precipitated to a great extent is then completely precipitated at 50° with common salt, filtered off, dried and mixed with 20% of its weight of sodium carbonate.

The dark brown powder so obtained dissolves well in hot water with a brown colour and it dyes wool in very fast brown shades from a bath containing ammonium sulphate.

If 20.9 parts of 1-(3'-chlorophenyl)-3-methyl-5-pyrazolone are used in the above example instead of 1-phenyl-3-methyl-5-pyrazolone, a very similar dyestuff is obtained.

*Example 8*

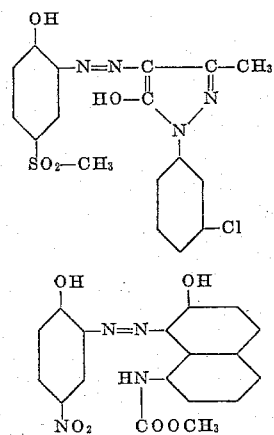

18.7 parts of 2-aminophenol-4-methyl sulphone are dissolved in 150 parts of water with 17 parts of conc. hydrochloric acid and diazotized at 5° in the usual way by the addition of 6.9 parts of sodium nitrite 100% (as 33% solution). The diazonium compound is neutralized with sodium hydrogen carbonate and then at 3° poured into a solution of 22 parts of 1-(3'-chlorophenyl)-3-methyl-5-pyrazolone in 300 parts of water and 16 parts of dehydrated sodium carbonate (dyestuff I).

15.4 parts of 4-nitro-2-aminophenol are dissolved hot in 150 parts of water with 17 parts of conc. hydrochloric acid. The solution is cooled to 5° and diazotized by the addition of 6.9 parts of sodium nitrite 100% (as 33% solution). On completion of the diazotisation, the whole is made exactly neutral to Congo red by the addition of sodium hydrogen carbonate and then poured into a solution of 22.8 parts of carbomethoxyaminonaphthol-(1.7) in 250 parts of water, 10.5 parts by volume of 10-n caustic soda lye and 15 parts of dehydrated sodium carbonate. The coupling is complete after some hours (dyestuff II).

On completion of the coupling, the suspension of dyestuff I is poured into that of dyestuff II. The two dyestuffs are boiled together for some hours with a solution of ammonium chromosalicylate (corresponding to 5.7 parts of Cr). The dyestuff is then filtered off and dried.

The new dyestuff is in the form of a black powder which dissolves in hot water with a brown colour. It dyes wool in very full deep brown shades from a neutral or weakly acid bath. The dyeings have very good fastness to washing, milling, sea water and stoving.

Similar dyestuffs are obtained if instead of 18.7 parts of 2-aminophenol - 4 - methyl sulphone, 18.8 parts of 2-aminophenol-4-sulphamide or 23.2 parts of 2-aminophenol-4-sulphethanolamide are used for the production of dyestuff I.

*Example 9*

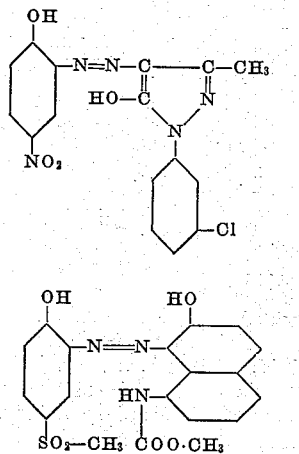

15.4 parts of 4-nitro-2-aminophenol are diazotized as described in Example 8. The diazonium solution, neutralised with sodium hydrogen carbonate, is poured into a solution of 22 parts of 1-(3'-chlorophenyl)-3-methyl-5-pyrazolone in 300 parts of water and 16 parts of dehydrated sodium carbonate. The coupling is complete after some hours and the dyestuff is precipitated and isolated in the usual way (dyestuff I).

18.7 parts of 2-aminophenol-4-methyl sulphone are diazotised as described in Example 8 and neutralised by the addition of sodium hydrogen carbonate. The diazonium compound is poured into a solution of 22.8 parts of carbomethoxyaminonaphthol-(1.7) in 250 parts of water, 10.5 parts by volume of caustic soda lye 10–n and 15 parts of dehydrated sodium carbonate. The coupling is complete after some hours. The whole is heated to 70°, the dyestuff, which has partly gone into solution, is precipitated by the addition of sodium chloride and filtered off. (Dyestuff II.)

43.7 parts of dyestuff II and 39.6 parts of dyestuff I are pasted together in 2000 parts of water and, with a solution of ammonium chromo-salicylate (corresponding to 5.7 parts Cr) are boiled for some hours. The dyestuff so formed is filtered off and dried.

Mixed with 30% of its weight of sodium carbonate, the new dyestuff is a black powder which dissolves in hot water with a brown colour. It dyes wool in deep brown shades from a neutral or weakly acid bath. The dyeings have very good fastness to light, washing, milling, sea water and stoving.

A similar dyestuff is obtained if instead of 18.7 parts of 2-aminophenol - 4 - methyl sulphone, 21.6 parts of 2-aminophenol-4-sulphodimethylamide are used for the production of dyestuff II.

*Example 10*

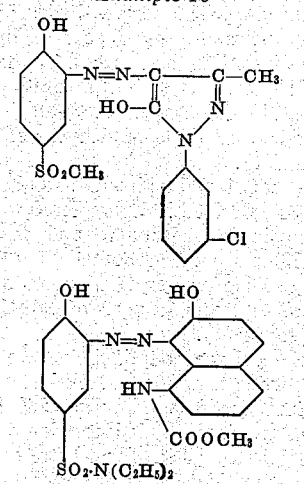

18.7 parts of 2-aminophenol-4-methyl sulphone are diazotised in the usual way. The diazonium compound is neutralised with sodium hydrogen carbonate and poured into a solution of 22 parts of 1-(3'-chlorophenyl)-3-methyl-5-pyrazolone in 300 parts of water and 16 parts of dehydrated sodium carbonate (dyestuff I).

24.4 parts of 2-aminophenol-4-sulphodiethylamide are dissolved in 150 parts of water with 10.5 parts by volume of 10–n caustic soda lye, 6.9 parts of sodium nitrite 100% (as 33% solution) are added and the whole is poured slowly at 0–5° into a solution of 25 parts of conc. hydrochloric acid and an equal amount of water. The diazonium compound in the form of suspension is made exactly neutral with sodium hydrogen carbonate and then poured into a solution of 22.8 parts of carbomethoxyaminonaphthol-(1.7) in 250 parts of water, 10.5 parts by volume of 10–n caustic soda lye and 15 parts of dehydrated sodium carbonate. The dyestuff is formed after a few hours (dyestuff II).

On completion of the coupling, the suspension of dyestuff I is poured into that of dyestuff II. The two dyestuffs are stirred together, a solution of ammonium chromo-salicylate (corresponding to 5.7 parts Cr) is added and the whole is boiled for some hours. The dyestuff is precipitated in the form of resin by the addition of sodium chloride. It is separated and dried. It is a black powder which dissolves well in water and dyes wool in deep brown shades from a weakly acid bath. The dyeings are very level and have good fastness to light, washing, milling and sea water.

*Example 11*

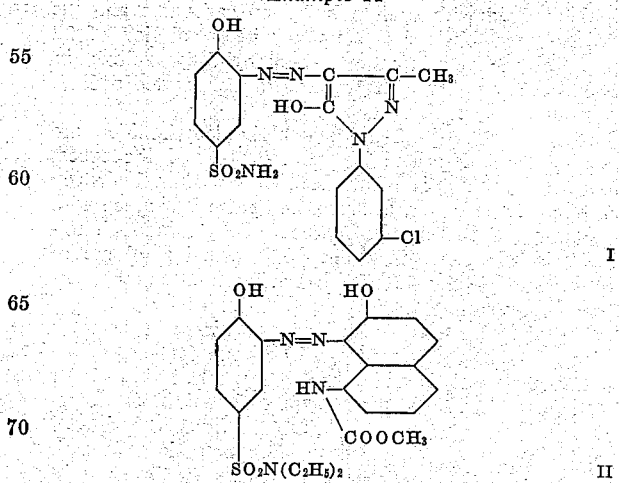

18.8 parts of 2-aminophenol-4-sulphamide are dissolved in 150 parts of water with 17 parts of conc. hydrochloric acid. The solution is cooled to 5°, and diazotised by the addition of 6.9 parts of sodium nitrite (as 30% solution). The excess hydrochloric acid is neutralised by the addition of sodium hydrogen carbonate. The diazonium compound in the form of a neutral paste is poured at 3° into a solution of 22 parts of 1-(3'-chlorophenyl)-3-methyl-5-pyrazolone in 300 parts of water and 16 parts of dehydrated sodium carbonate (dyestuff I).

24.4 parts of 2-aminophenol-4-sulphodiethylamide are diazotised as described in Example 10 and neutralised with sodium hydrogen carbonate and coupled with a solution of 22.8 parts of carbomethoxyaminonaphthol-(1.7) in 250 parts of water, 10.5 parts by volume of 10–n caustic soda lye and 15 parts of dehydrated sodium carbonate (dyestuff II).

On completion of the coupling, the two dyestuff suspensions are stirred together, a solution of ammonium chromo-salicylate (corresponding to 5.7 parts Cr) is added and the whole is boiled for some hours. The dyestuff is precipitated in the form of resin by the addition of sodium chloride. It is filtered and dried. It is a black powder which dissolves well in hot water and dyes wool in deep brown shades from a weakly acid bath. The dyeings are very full and have good fastness to washing, milling and sea water and stoving.

*Example 12*

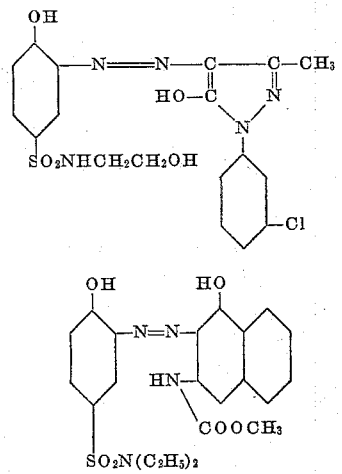

23.2 parts of 2-aminophenol-4-sulphethanolamide are dissolved in 150 parts of water with 17 parts of conc. hydrochloric acid and diazotised by the addition of 6.9 parts of sodium nitrite (as 30% solution). On completion of the diazotisation, the excess hydrochloric acid is neutralised with sodium hydrogen carbonate and the diazonium compound is coupled with a solution of 22 parts of 1-(3'-chlorophenyl)-3-methyl-5-pyrazolone in 300 parts of water with 16 parts of dehydrated sodium carbonate (dyestuff I).

24.4 parts of 2-amino-4-sulphodiethylamide are diazotised as described in Example 10 and the excess hydrochloric acid is neutralised with sodium hydrogen carbonate. This neutral diazonium paste is coupled with a solution of 22.8 parts of carbomethoxyaminonaphthol-(1.7) in 250 parts of water, 10.5 parts by volume of 10–n soda lye and 15 parts of dehydrated sodium carbonate (dyestuff II).

The two dyestuff suspensions are stirred together, a solution of ammonium chromo-salicylate (corresponding to 5.7 parts Cr) is added and the whole is boiled for some hours. The dyestuff is precipitated in the form of resin by the addition of sodium chloride. It is filtered and dried. It is a black powder which dissolves well in hot water and dyes wool in brown shades from a weakly acid bath. The dyeings are very level and full and have excellent fastness to washing, milling, sea water and stoving.

*Example 13*

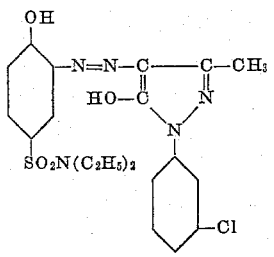

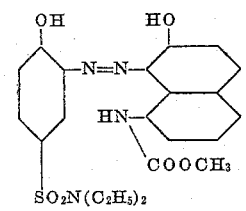

24.4 parts of 2-aminophenol-4-sulphodiethylamide are diazotised and after being neutralised with sodium hydrogen carbonate are poured into a solution of 13 parts of carbomethoxyaminonaphthol-(1.7), 12 parts by volume of 10–n caustic soda lye, 9.3 parts of 1-(3'-chlorophenyl)-3-methyl-5-pyrazolone and 15 parts of dehydrated sodium carbonate in 1000 parts of water.

On completion of the coupling, a solution of ammonium chromo-salicylate (corresponding to 2.85 parts Cr) is added to the suspension of the dyestuffs formed and the whole is boiled for some hours. A dark brown solution is formed to which sodium chloride is added. The dyestuff precipitates in the form of resin. It is separated and dried. It is in the form of a dark powder which, after mixing with 20% of its weight of dehydrated sodium carbonate, dissolves well in water. It dyes wool in brown shades from a weakly acid bath. The dyeings have very good fastness to milling, washing and light.

Similar dyestuffs are obtained if instead of 24.4 parts of 2-aminophenol-4-sulphodiethylamide, 23.3 parts of 2-aminophenol-4-sulphethanolamide or 27.6 parts of 2-aminophenol-4-sulphodiethanolamide are used.

*Example 14*

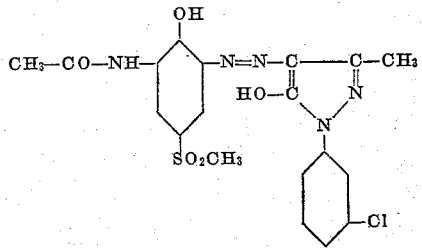

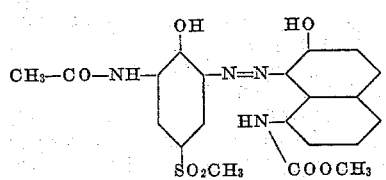

A solution of 22 parts of 1-(3'-chlorophenyl)-3-methyl-5-pyrazolone in 300 parts of water and 5 parts of sodium hydroxide is poured into the suspension of the diazo compound obtained from 24.4 parts of 6-acetylamino-2-amino-1-phenol-4-methyl-sulphone. The whole is stirred until there is no longer any trace of the diazo compound and then heated to 70°. 70 parts of common salt are added and the dyestuff is filtered off (dyestuff I).

7 parts of conc. hydrochloric acid are added to 300 parts of a solution which contains 24.4 parts of 6-acetyl-amino-2-amino-1-phenol-4-methyl sulphone in the form of the chlorohydrate. After cooling to 3°, a solution containing 6.9 parts of sodium nitrite is added. The diazonium compound which has partly precipitated in the form of clay yellow coloured crystals is neutralised with sodium hydrogen carbonate and then poured into a solution of 23 parts of carbomethoxyaminonaphthol-(1.7) in 200 parts of water, 4.2 parts of sodium hydroxide and 15 parts of dehydrated sodium carbonate. The whole is stirred at 0–5° until the dyestuff has completely formed. The dyestuff is then completely precipitated by the addition of common salt and filtered off (dyestuff II).

48.6 parts of the monosodium salt of dyestuff I and 49.4 parts of the monosodium salt of dyestuff II are stirred together in 1000 parts of water, a solution of ammonium chromo-salicylate (corresponding to 9.1 parts $Cr_2O_3$) is added and the whole is boiled for 6 hours under reflux. The chrome containing dyestuff is completely precipitated by the addition of common salt and after cooling, it is filtered off and dried. It is a black powder which dissolves well in hot water and dyes wool in dark brown shades from a weakly acid bath. The dyeings have very good fastness properties.

6-acetylamino-2-amino-1-phenol-4-methylsulphone is obtained as follows: 6-nitro-2-aminophenol-4-methyl sulphone is acetylated to 6-nitro-2-acetylamino-1-phenol-4-methyl sulphone. This is dissolved with diluted caustic soda lye and reduced catalytically and the 6-nitro-2-acetylamino-1-phenol-4-methyl sulphone is precipitated with acetic acid. Recrystallised from hot water, white needles are obtained. M. P. 191–192°.

Similar dyestuffs are obtained if, instead of 24.4 parts of 6-acetylamino-2-amino-1-phenol-4-methyl sulphone, 26.0 parts of 6-carbomethoxyamino-2-amino-1-phenol-4-methyl sulphone or 27.4 parts of 6-carbethoxyamino-2-amino-1-phenol-4-methyl sulphone are used.

*Example 15*

2 parts of the dyestuff obtained according to Example 1 are dissolved in 4000 parts of water, 10 parts of Glaubers salt are added and 100 parts of wool are entered at 50°. The bath is brought to the boil within 30 minutes and held at the boil for 1½ hours while moving the wool well. Thereafter the goods are rinsed and dried. The wool which has been dyed in a deep brown shade is very fast to milling, alkali, sea water, and light. The dyeing is also characterised by good fastness to rubbing and carbonising.

What I claim is:

1. A complex chromium compound of the general formula I-Cr-II, wherein I and II are co-ordinated monoazo dyestuffs free from carboxylic and sulphonic acid groups of the formulae:

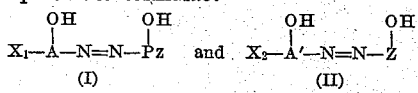

wherein A and A' represent aromatic nuclei of the benzene series containing the hydroxy group in ortho position to the azo group and the substituents $X_1$ and $X_2$ in para position to the hydroxy group and wherein the one X is a member selected from the class consisting of low molecular alkylsulphonyl and

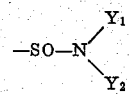

groups and the other X is a member selected from the class of the nitro group, low molecular alkylsulphonyl and

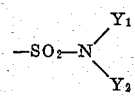

groups, Y meaning a member selected from hydrogen, low molecular alkyl and hydroxyalkyl groups, Pz represents the radical of a 1-aryl-3-methyl-5-pyrazolone of the benzene series coupled in 4-position and Z represents the radical of a 1-acylamino-7-hydroxynaphthalene coupled in 8-position.

2. A complex chromium compound of the general formula I—Cr—II wherein I and II are co-ordinated monoazo dyestuffs free from sulphonic and carboxylic acid groups of the formulae:

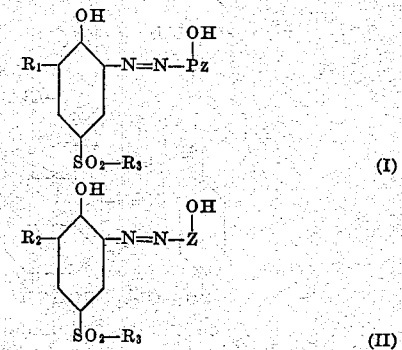

wherein $R_1$ and $R_2$ represent members selected from the class consisting of hydrogen, chlorine, methyl and acylamino groups, $R_3$ represents a low molecular aliphatic hydrocarbon radical, Pz represents the radical of a 1-aryl-3-methyl-5-pyrazolone of the benzene series coupled in 4-position and Z represents the radical of a 1-acylamino-7-hydroxynaphthalene coupled in 8-position.

3. A complex chromium compound of the formula I—Cr—II wherein I and II are co-ordinated monoazo dyestuffs of the formulae:

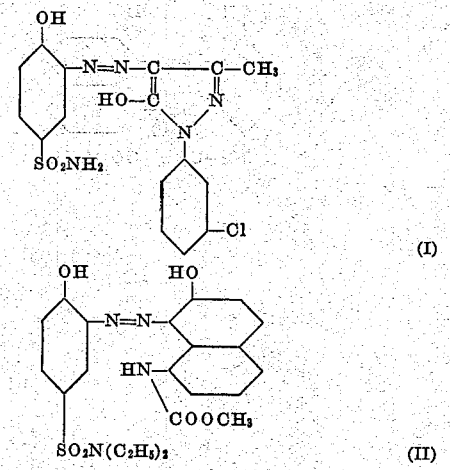

4. A complex chromium compound of the formula I—Cr—II wherein I and II are co-ordinated monoazo dyestuffs of the formulae:

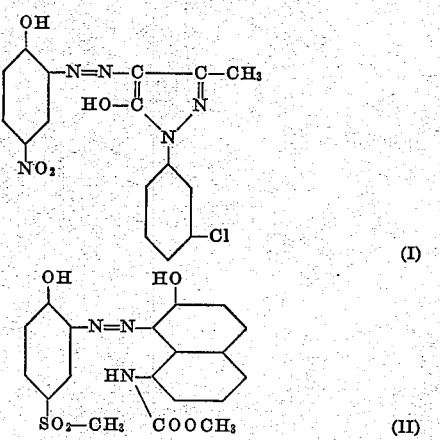

5. A complex chromium compound of the formula I—Cr—II wherein I and II are co-ordinated monoazo dyestuffs of the following formulae:

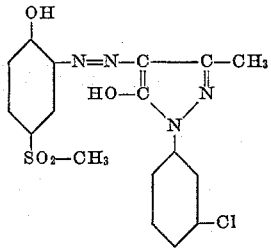

(I)

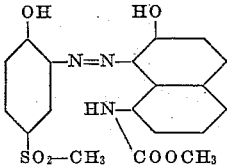

(II)

6. A complex chromium compound of the formula I—Cr—II wherein I and II are co-ordinated monoazo dyestuffs of the formula

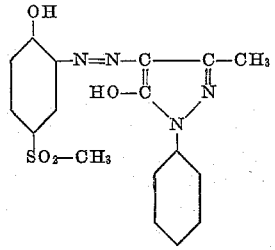

(I)

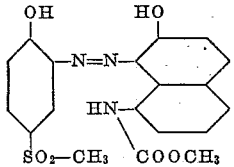

(II)

7. A complex chromium compound of the formula I—Cr—II wherein I and II are co-ordinated monoazo dyestuffs of the formulae:

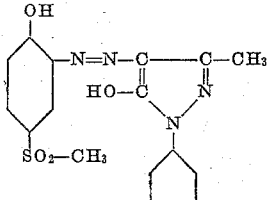

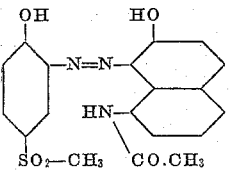

References Cited in the file of this patent
UNITED STATES PATENTS

| | | |
|---|---|---|
| 2,104,357 | Straub et al. | Jan. 4, 1938 |
| 2,551,056 | Schetty | May 1, 1951 |